April 21, 1964  L. G. SIMJIAN  3,130,395
SERVICE AREA WITH COMPARTMENTS
Filed Aug. 28, 1962  2 Sheets-Sheet 1
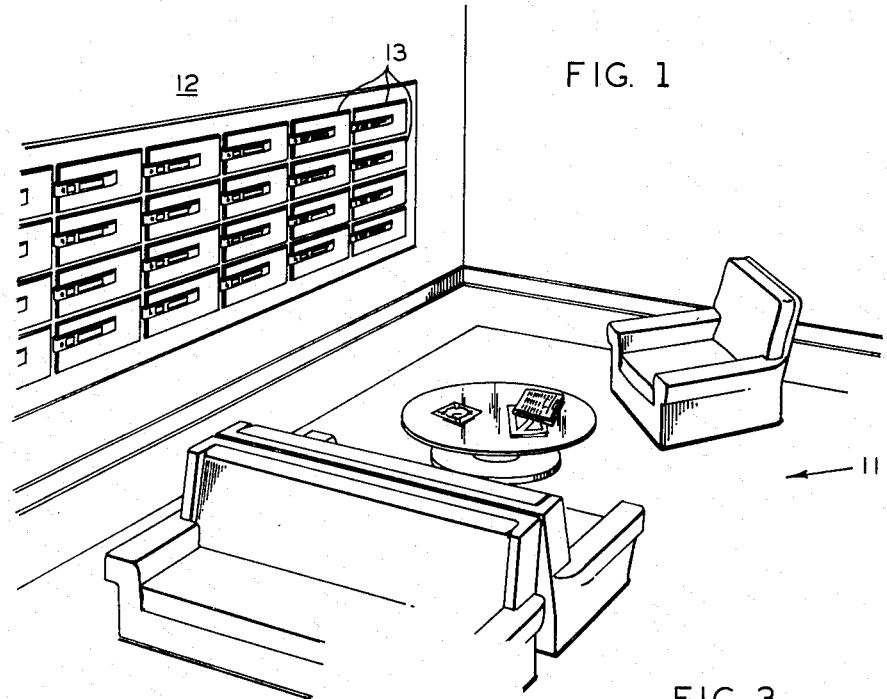
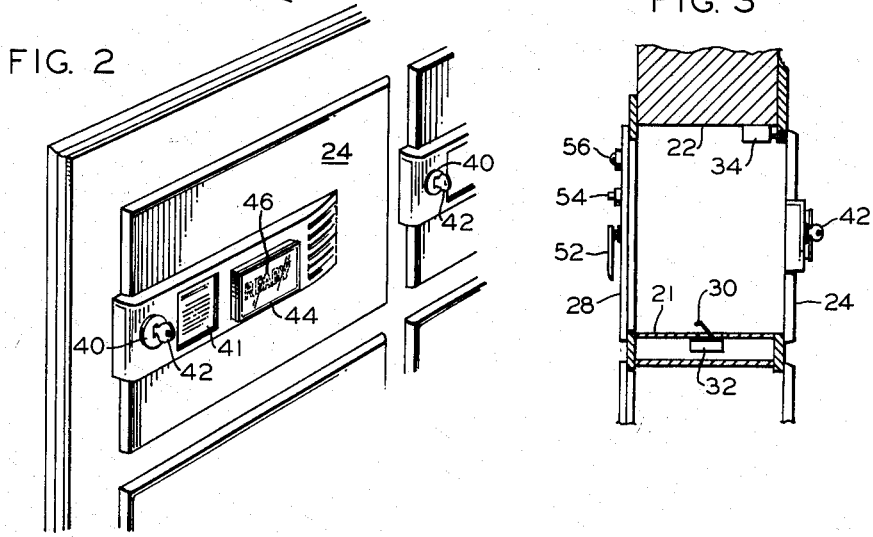
INVENTOR.
LUTHER G. SIMJIAN
BY Ervin B. Steinberg
AGENT April 21, 1964 L. G. SIMJIAN 3,130,395
SERVICE AREA WITH COMPARTMENTS
Filed Aug. 28, 1962 2 Sheets-Sheet 2
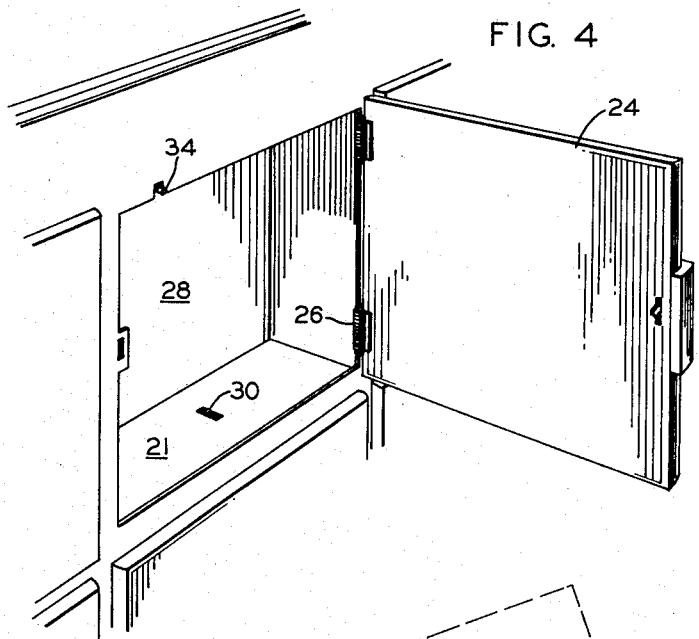
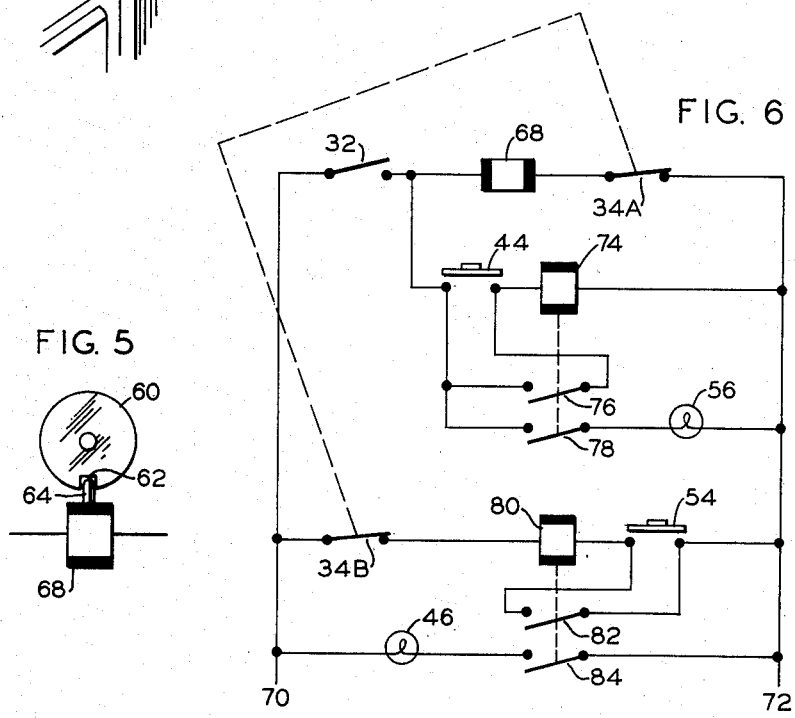
*INVENTOR.*
LUTHER G. SIMJIAN
BY
AGENT

United States Patent Office 3,130,395
Patented Apr. 21, 1964

3,130,395
SERVICE AREA WITH COMPARTMENTS
Luther G. Simjian, Laurel Lane, Greenwich, Conn.
Filed Aug. 28, 1962, Ser. No. 220,000
9 Claims. (Cl. 340—280)

The present invention relates to an area which is equipped with compartments for providing service to customers.

More particularly, the invention concerns an arrangement of compartments for use by patrons desirous of banking service or service where an exchange of articles, documents, money and so forth takes place. Quite specifically, the present invention concerns a service area which is provided with a plurality of compartments which are accessible from two sides. Each compartment is capable of being locked from one side upon receipt of an article from the respective side and subsequently is adapted to be unlocked upon receipt of an exchange article supplied from the other side. Signaling means are provided to indicate respectively when service is desired or the transaction has been completed. Electrical interlock means prevent locking of a compartment in the absence of a deposit.

One object of this invention, therefore, is the provision of a new and novel arrangement for providing service in a banking institution or similar organization.

Another object of this invention is the provision of an arrangement which includes compartments for providing personal service, obviating the need for standing in line while affording simultaneously utmost privacy and convenience.

A further object of this invention is the provision of an arrangement for providing convenience and safety in transactions involving the exchange of documents having a monetary value.

Further and other objects of this invention will be apparent from the following description when taken in conjunction with the accompanying drawings in which:

FIGURE 1 is a perspective view of the service area;
FIGURE 2 is a close-up view of the front of one of the compartments;
FIGURE 3 is a cross section view through one of the compartments;
FIGURE 4 is a view similar to FIGURE 2 with the front door opened;
FIGURE 5 is a view illustrating a detail of the locking mechanism, and
FIGURE 6 is a schematic electrical circuit diagram.

Referring now to the figures and FIGURE 1 in particular, numeral 11 generally refers to a service area which for the convenience of patrons is furnished with various accommodations to provide a generally pleasant and relaxing atmosphere. One or more walls 12 of this service area is provided with an array of individual compartments 13, each being adapted to be opened by respective customers and locked during the time that a transaction is taking place.

The construction of each compartment is more clearly evident from FIGURES 2, 3 and 4 wherein numerals 21 and 22 identify the inside bottom and top surfaces of a compartment. The front of each compartment is provided with a hinge mounted door 24 which is urged toward the compartment by means of a pair of spring hinges 26. The rear wall of each compartment is formed by a similar door 28. It shall be understood, however, that the rear door may be omitted if so desired.

The presence of an article in the compartment is sensed by an actuating arm 30 forming a part of an electrical circuit switch 32 and protruding through a suitable aperture in bottom surface 21. Upon depositing a document or other article in the compartment, the arm is depressed, thereby actuating switch 32 to condition an electrical circuit. It shall be understood that this switch may be replaced by photoelectric sensing means. A switch 34 mounted near the front of the compartment is actuated by door 24 and senses the condition when the door is closed. This switch has two electrical contacts 34A and 34B identified in FIGURE 6.

Each front door 24 is provided with a cylinder lock 40 and associated key 42 for locking the door against the compartment. There is provided also an instruction plate 41 and a pushbutton switch 44 which additionally includes a signaling light with legend 46. The pushbutton switch and signaling light operate independently as will be apparent from the circuit in connection with FIGURE 6.

The rear door 28 is provided with a locking handle 52, a pushbutton switch 54 and a signaling light 56.

The lock and key means is a conventional pin tumbler lock, normally retained in the unlocked position. In order to achieve this condition, the rotating plunger of the conventional lock is provided with a cam 60, FIGURE 5, which has a recess 62 adapted to be engaged by plunger 64 of solenoid 68. The solenoid and cam are positioned such that the lock is retained in its unlocked position until actuation of solenoid 68 occurs, whereupon the key may be rotated to lock the door and the previously captive key can be removed. It is well known that in pin tumbler type locks, the key cannot be removed when the lock is rotated from its normal position.

The operation of the instant arrangement will be more clearly apparent by referring to the electrical circuit diagram FIGURE 6. A patron desiring to use the above described arrangement to transact business of a banking type nature enters the service area and selects a compartment which exhibits a key protruding from the lock as apparent for instance in FIGURE 2. Next, the patron opens door 24 and deposits his documents, such as checks, currency, and so forth in the compartment. The presence of an article in the compartment closes the contact of switch 32 and upon closing the door 24, contact 34A associated with switch 34 establishes a circuit between conductors 70 and 72. Solenoid 68, connected in series is energized and retracts its plunger 64, thereby permitting key 42 to be turned for locking the door against the compartment. When the locked position is obtained, key 42 can be withdrawn in the conventional manner. The compartment now has been locked by the patron. In order to signify to the bank teller or attendant the presence of an article in the compartment which must be acted upon, the patron momentarily depresses pushbutton switch 44 which energizes relay 74. The relay locks up through contact 76, and associated contact 78 energizes signaling means 56 disposed at the rear door, thereby calling attention that service is required. Upon opening rear door 28 by turning handle 52 and removing the deposit, switch arm 30 returns to its raised position and opens contact 32, which condition in turn opens the circuit between conductors 70 and 72, thereby de-energizing relay 74 and extinguishing lamp 56.

When the bank teller has completed his work, a receipt, a validated passbook or similar article is deposited in the compartment. To signify the completion of his work, he momentarily operates pushbutton switch 54 which energizes relay 80 connected in series with door switch contact 34B. Relay 80 locks in via contact 82 and contact 84 energizes signlaing means 46 at the front door to indicate to the patron that the transaction has been completed. Upon insertion of key 42 into lock 40, unlocking of the door and opening of the front door, switch contact 34B is opened, thereby interrupting the circuit to relay 80, thus causing the relay to be de-energized and indicating light 46 to become extinguished. As soon as the lock is rotated and the door opened, plunger 64 reengages recess 62 thereby retaining the lock open and preventing withdrawal of the key from the lock. In the absence of another deposit in the compartment which in turn would actuate switch 32, the lock means remains blocked in the unlocked position.

It will be apparent that a circuit per FIGURE 6 and the electrical controls indicated are repeated for each compartment.

While the foregoing arrangement has been described in connection with banking operations, it will be apparent that the same arrangement may be used for receiving articles of merchandise in department stores, in supermarkets and so forth, where either an order slip, a check or a credit card is deposited and subsequently, the ordered merchandise can be retrieved. Alternatively, the foregoing arrangement may be used for the deposit of valuable articles which require repair for instance, watches and jewelry.

While there has been described and illustrated a specific embodiment of the present invention, it will be apparent to those skilled in the art that various changes and modifications may be made therein without deviating from the principle and intent of the present invention, which shall be limited only by the scope of the appended claims.

What is claimed is:

1. A service area of the type described including in combination:
   a compartment accessible from two sides for receiving articles from each of said two sides;
   a door mounted for providing access to said compartment from one of said sides when said door is open and for preventing access when said door is closed;
   lock and key means for locking said door and for preventing access to said compartmnet;
   sensing means disposed for sensing the presence of an article in said compartment;
   means for maintaining said lock means in the absence of an article in an unlocked position and for maintaining said key means captive in said lock means while said lock means is in said unlocked position,
   and means coupled to said lock means and to said sensing means for rendering said lock means changeable from said unlocked position to a locked position and for enabling removal of said key means when said lock means has assumed said locked position in response to said sensing means sensing the presence of an article in said compartment.

2. A service area of the type described including in combination:
   a compartment accessible from two sides for receiving articles from each of said two sides;
   a door mounted for providing access to said compartment from one of said sides when said door is open and for preventing access when said door is closed;
   lock and key means for locking said door for preventing access to said compartment;
   sensing means disposed for sensing the presence of an article in said compartment;
   means for maintaining said lock means in the absence of an article in an unlocked position and for maintaining said key means captive in said lock means while said lock means is in said unlocked position;
   means coupled to said lock means and to said sensing means for rendering said lock means changeable from said unlocked position to a locked position and for enabling removal of said key means when said lock means has assumed said locked position in response to said sensing means sensing the presence of an article in said compartment,
   and signaling means associated with said compartment to indicate the presence of an article therein.

3. A service area of the type described and as set forth in claim 2 wherein said signaling means is operable in response to said sensing means sensing the presence of an article in said compartment.

4. A service area of the type described and as set forth in claim 2 wherein said sensing means are connected in an electrical circuit.

5. A service area of the type described and as set forth in claim 2 wherein said signaling means comprises an electrical lamp.

6. A service area of the type described including in combination:
   a compartment accessible from two sides for receiving articles from each of said two sides;
   a door mounted for providing access to said compartment from one of said sides when said door is open and for preventing access when said door is closed;
   lock and key means for locking said door and for preventing access to said compartment;
   electrical sensing means disposed for actuation by an article in said compartment whereby to sense the presence of an article in said compartment;
   cam means for maintaining said lock means in the absence of an article in an unlocked position and for maintaining said key means captive in said lock means while said lock means is in said locked position;
   electrically actuated means coupled to said lock means and to said sensing means for rendering said lock means changeable from said unlocked position to a locked position and for enabling removal of said key means when said lock means has assumed said locked position in response to the actuation of said sensing means,
   and electrical signaling means disposed externally to said compartment and operable in response to the presence of an article in said compartment to indicate the presence of an article therein.

7. A service area of the type described and as set forth in claim 6 wherein said compartment includes a further door for providing access to said compartment from the other side when said further door is open and preventing access when said further door is closed.

8. A service area of the type described including in combination:
   a plurality of compartments;
   each of said compartments being accessible from two sides for receiving articles from each of said two sides;
   a door mounted on each of said two sides of each compartment for providing access to a respective compartment from said sides when a respective door is open and for preventing access when the respective door is closed;
   lock and key means cooperative with each compartment and at least one of said doors mounted to each of said compartments;
   sensing means disposed in each compartment for actuation by an article in the respective compartment whereby to sense the presence of an article;
   means for maintaining each lock means in the absence of an article in a respective compartment in an unlocked position and for maintaining said key means captive in said lock means while said lock means is in said unlocked position;
   means coupled to each lock means and the respective sensing means for rendering the associated lock means changeable from said unlocked position to a locked position and for enabling removal of said key means when said lock means has assumed said locked position in response to the actuation of said sensing means,
   and signaling means disposed externally to said compartment and operable in response to the presence of an article in a respective compartment to indicate the present of an article in said respective compartment.

9. A service area of the type described and as set forth in claim 8 wherein said signaling means are arranged on said two sides and means are provided to operate said signaling means to indicate the presence of an article in a respective compartment.

References Cited in the file of this patent

UNITED STATES PATENTS

| | | |
|---|---|---|
| 596,993 | Gray | Jan. 11, 1898 |
| 982,689 | Perrin | Jan. 24, 1911 |
| 1,239,240 | Williams | Sept. 4, 1917 |
| 2,259,389 | Metzerott | Oct. 14, 1941 |
| 2,436,702 | Sweich | Feb. 24, 1948 |
| 2,535,607 | Smith | Dec. 26, 1950 |